United States Patent [19]

Tack

[11] Patent Number: 5,580,451
[45] Date of Patent: Dec. 3, 1996

[54] AIR CONDITIONING REFRIGERANT FLUID DRYER ASSEMBLY

[75] Inventor: Jerry A. Tack, Troy, Mich.

[73] Assignee: Automotive Fluid Systems, Inc., Wilmington, Del.

[21] Appl. No.: 431,770

[22] Filed: May 1, 1995

[51] Int. Cl.$^6$ ................................................ B01D 15/00
[52] U.S. Cl. .......................... 210/266; 62/474; 96/108; 210/282; 210/DIG. 6
[58] Field of Search ........................... 62/474; 96/108, 96/152; 210/266, 282, DIG. 6

[56] References Cited

U.S. PATENT DOCUMENTS

| | | | |
|---|---|---|---|
| 2,148,770 | 2/1939 | Mittendorf | 210/131 |
| 2,233,093 | 2/1941 | Carman et al. | 210/131 |
| 2,325,657 | 8/1943 | Burkness | 210/134 |
| 2,758,719 | 8/1956 | Line | 62/474 |
| 3,064,819 | 11/1962 | Jones | 210/266 |
| 3,080,977 | 3/1963 | Jones | 210/232 |
| 3,254,771 | 6/1966 | Sicard | 210/266 |
| 3,545,227 | 12/1970 | Grahl | 62/474 |
| 3,799,352 | 3/1974 | McClive | 210/282 |
| 3,879,292 | 4/1975 | McClive | 210/282 |
| 3,918,578 | 11/1975 | Cullen et al. | 206/204 |
| 3,926,599 | 12/1975 | Rudin et al. | 55/387 |
| 4,177,145 | 12/1979 | Schumacher | 210/136 |
| 4,209,401 | 6/1980 | Henton | 210/136 |
| 4,266,408 | 5/1981 | Krause | 62/474 |
| 4,320,000 | 3/1982 | Lange et al. | 210/117 |
| 4,354,362 | 10/1982 | Schumacher et al. | 62/474 |
| 4,436,623 | 3/1984 | Cullen et al. | 210/282 |
| 4,457,843 | 7/1984 | Cullen et al. | 210/282 |
| 4,464,261 | 8/1984 | Cullen et al. | 210/DIG. 6 |
| 4,509,340 | 4/1985 | Mullally et al. | 62/503 |
| 4,623,368 | 11/1986 | Lancesseur | 55/387 |
| 4,626,350 | 12/1986 | Reid | 210/282 |
| 4,698,985 | 10/1987 | Wintersteen | 62/474 |
| 4,707,999 | 11/1987 | Ohta et al. | 62/474 |
| 4,711,718 | 12/1987 | Nelson, Jr. | 210/282 |
| 4,788,833 | 12/1988 | Steele | 62/474 |
| 4,811,571 | 3/1989 | Mayer | 62/474 |
| 4,886,599 | 12/1989 | Bachmann et al. | 210/287 |
| 4,921,512 | 5/1990 | Maryyanek et al. | 55/488 |
| 5,036,972 | 8/1991 | Cullen et al. | 96/108 |
| 5,038,582 | 8/1991 | Takamatsu | 62/474 |
| 5,184,480 | 2/1993 | Kolpacke | 62/503 |
| 5,191,775 | 3/1993 | Shiina et al. | 62/503 |
| 5,201,792 | 4/1993 | Study | 62/503 |
| 5,364,540 | 11/1994 | Sciuto | 210/806 |
| 5,435,153 | 7/1995 | Hutchison et al. | 62/474 |

*Primary Examiner*—Ivars Cintins
*Attorney, Agent, or Firm*—Remy J. VanOphem; John VanOphem; Thomas A. Meehan

[57] ABSTRACT

An automotive-type air conditioning refrigerant fluid dryer assembly composed of a receiver tank and desiccant cup assembly that are configured to enhance the operation and durability of the refrigerant fluid dryer assembly, as well as facilitate its assembly. The receiver tank is formed to have a unitary construction. The desiccant cup is provided with a number of axially-spaced nib segments disposed adjacent its open end that form detents and a cap that is received in the open end of the cup such that a peripheral edge of the cap engages at least some of the nib segments so as to secure the cap to the cup. During assembly, the cap is pressed downward into the cup until contact is made with the desiccant within and is thereafter secured within the cup by the nib segments. As such, assembly of the cap with the cup involves a simple push-type operation, yet enables the cap to positively confine the desiccant within the cup, such that relative movement of the desiccant within the chamber is restricted. The cup assembly also includes a sealing lip for preventing blowby and assembly problems. As such, the dryer assembly of this invention utilizes a minimal number of components so as to reduce the number of joining operations required, while the desiccant cup assembly has an uncomplicated configuration that readily accommodates variations in fill level of the desiccant.

20 Claims, 1 Drawing Sheet

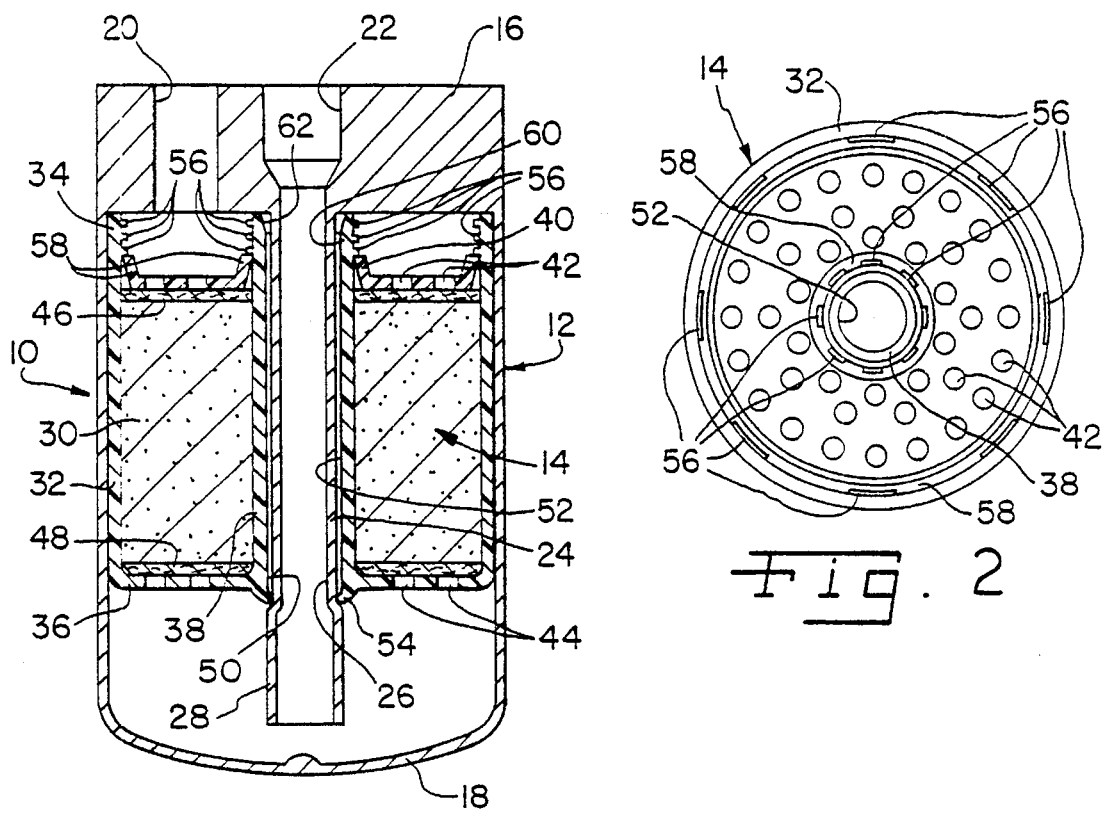
Fig. 1
Fig. 2
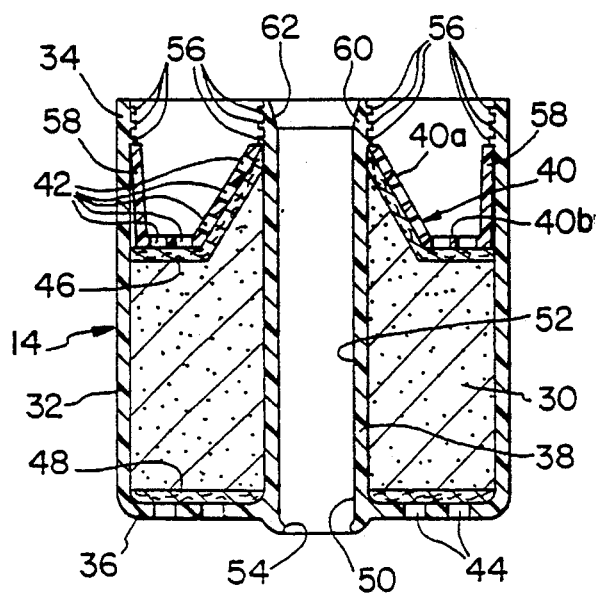
Fig. 3

5,580,451

AIR CONDITIONING REFRIGERANT FLUID DRYER ASSEMBLY

BACKGROUND OF THE INVENTION

1. Field of the Invention

The present invention generally relates to automotive-type air conditioning refrigerant fluid dryer systems. More specifically, this invention relates to an air conditioning receiver/dryer assembly composed of a receiver tank and desiccant cup assembly that are configured to enhance the operation and durability of the receiver/dryer assembly and facilitate its assembly.

2. Description of the Prior Art

Automotive air conditioning systems use a compressor which compresses a vaporized refrigerant fluid, such as freon or an alternative refrigerant, to raise the temperature of the refrigerant fluid, which is then cooled and returned to a liquid state with a condenser. As a result, heat added to the refrigerant fluid in the compressor is transferred out of the system. The cooled refrigerant fluid is then sprayed through a thermal expansion valve into an evaporator where it is again vaporized. The heat of vaporization required for vaporizing the refrigerant is drawn from incoming outside air flowing or blown through the evaporator. Excess humidity contained within the incoming air is removed as condensation on the evaporator, therefore also drying the incoming air. The cooled, dry air then enters the passenger compartment of the vehicle, while the refrigerant is drawn back to the compressor where it is again compressed and the cycle repeated.

In automotive-type air conditioning systems, a receiver dryer device is typically employed between the condenser and the thermal expansion valve. Receiver/dryers remove any remaining moisture from the circulating refrigerant fluid with the use of a desiccant contained within the receiver/dryer, so as to ensure that the refrigerant fluid delivered to the expansion valve is in a liquid phase and free of condensation. Various forms of receiver/dryer devices have been suggested in the prior art. Generally, such devices include a cylindrical container having an inlet and an outlet for connecting to the refrigerant circuit. The desiccant is typically contained in a pack or otherwise restrained within the cylindrical container. The construction of the receiver/dryer device is such that refrigerant flow is directed through the desiccant, so that the desiccant can perform its intended function of removing moisture from the refrigerant. A tube is often used to return the refrigerant from one end of the container, into which the refrigerant is discharged after having passed through the desiccant, to the opposite end of the container, which is typically the same end through which the refrigerant originally entered the container.

It is generally conventional in the art to form the cylindrical container from a metal such as aluminum or an aluminum alloy, necessitating that separate subcomponents of the container be joined by brazing, welding, crimping or other suitable mechanical methods. Brazing, such as the tube-to-container braze joint seen in U.S. Pat. No. 3,545,227 to Grahl, can be problematic in that there may be braze residue remaining in the joined regions which may lead to contamination or pinhole leaks within the assembly. If the resulting leak is to the environment, a loss in the pressurized refrigerant fluid charge will result, while internal leaks can cause icing to occur within the air conditioning system or cause the system to operate as if it were undercharged. As an alternative to brazing for aluminum or steel materials, arc welding may be used to join the various components. However, the arc welding process can also be problematic in that it may result in detrimental dimensional changes to the assembly. Finally, various mechanical joining methods, such as a press fit between the tube and container, as taught by U.S. Pat. No. 5,038,582 to Takamatsu, can result in inadequate seals due to tooling variances and dimensional tolerances.

Similarly, numerous methods and components have been suggested for containing the desiccant. For example, U.S. Pat. Nos. 3,064,819 to Jones, 4,177,145 to Schumacher, 4,209,401 to Henton, 4,266,408 to Krause, 4,354,362 to Schumacher et al., 4,811,571 to Mayer and 5,364,540 to Sciuto teach the use of a biasing member of one sort or another in conjunction with a pad, screen or filter for the purpose of compacting the desiccant, so as to reduce the amount of relevant movement between the individual desiccant particles. Such a capability is generally an important aspect of receiver/dryer designs, since relative movement of desiccant particles will tend to cause damage to the particles through abrasion, ultimately reducing the effectiveness of the desiccant and adding particles to the refrigerant fluid which may damage the air conditioning system.

While spring-biased securement of the desiccant generally serves its purpose well, it would be preferable to avoid the additional cost and assembly steps required to position and secure a spring within the container. The prior art has suggested alternative methods for containing a desiccant, such as appropriately sizing a cartridge in which the desiccant is contained, as taught by U.S. Pat. No. 4,436,623 to Cullen et al. However, such cartridges are filled with desiccant based on weight, such that the amount of desiccant deposited in a pre-sized cartridge can vary as a result of variations in desiccant density. Consequently, an underfill condition can result that permits excessive agitation of the desiccant particles. This results in the desiccant abrading and breaking down into smaller particles which may leak into the system. Another alternative is to form a molded desiccant core, as taught by U.S. Pat. No. 4,320,000 to Lange et al. However, such an approach adds unwanted processing cost to the desiccant material.

From the above discussion, it can be readily appreciated that, while receiver/dryer devices are a desirable component within automobile air conditioning systems, the manufacturing processes used to form such assemblies are often complicated by the various joining operations required and the additional components required to properly restrain the movement of the desiccant material. Accordingly, what is needed is an improved receiver/dryer device that avoids the shortcomings of the prior art. In particular it would be desirable to provide a receiver/dryer assembly that is manufactured from a minimal number of components, so as to reduce the number of joining operations required and thereby the potential for leaks. Further, it would also be particularly desirable if such a receiver/dryer assembly were configured to readily adapt to variations in fill level of the desiccant without requiring additional biasing devices and additional desiccant processing, be configured to prevent blowby of the refrigerant fluid, and be keyed to prevent improper assembly of the device.

SUMMARY OF THE INVENTION

According to the present invention there is provided an automotive-type air conditioning receiver/dryer assembly composed of a receiver tank and desiccant cup assembly that are configured to enhance the operation and durability of the receiver/dryer assembly, as well as facilitate its assembly. More particularly, the receiver/dryer assembly of this invention utilizes a minimal number of components so as to reduce the number of joining operations required, while the desiccant cup assembly has an uncomplicated configuration that readily accommodates variations in fill level of the desiccant.

The refrigerant fluid receiver/dryer assembly of this invention generally includes a cup assembly received within a receiving member. The receiving member is composed of a tank having a first end and an oppositely-disposed second end, with the first end being generally closed and equipped with an inlet and an outlet. The receiving member further includes a centrally-located exit tube projecting axially within the tank from its first end. The exit tube is formed to have a passage in fluidic communication with the outlet of the tank. As just described, the tank forms an annular-shaped receptacle, with the exit tube forming a radially-inward boundary of the receptacle.

The cup assembly of the refrigerant fluid receiver/dryer assembly of this invention is adapted to be received within the annular-shaped receptacle of the tank. The cup assembly generally includes a cup member having a closed end and an oppositely-disposed open end, with the closed end being formed to have a central aperture surrounded by a number of holes. A centrally-located tubular portion projects axially within the cup member from its closed end, and forms a radially-inward boundary of an annular-shaped chamber within the cup member that is adapted to contain a desiccant. The tubular portion has a through-hole in fluidic communication with the central aperture in the closed end of the cup member. The closed end of the cup preferably includes a sealing portion projecting axially outward from the closed end. The sealing portion is preferably coaxial with the tubular portion of the cup member, and defines an opening that is in fluidic communication with the through-hole of the tubular portion. When assembled with the receiving member, the tubular portion's through-hole receives the exit tube of the receiving member, and the cup member's sealing portion engages the exit tube so as to form a fluid-tight seal.

As an advantageous feature of this invention, the cup member is provided with a number of nib segments disposed adjacent its open end, and the tubular portion may be provided with a number of nib segments disposed adjacent its end adjacent the open end of the cup member. Preferably, the nib segments are axially-spaced and circumferentially-spaced apart from each other so as to form detents distributed on the cup member and tubular portion. Finally, a closure member is received in the open end of the cup member, such that a peripheral edge of the closure member engages at least some of the nib segments so as to secure the closure member to the cup member. The closure member is formed to have apertures to enable penetration of the closure member by a refrigerant fluid. In one embodiment, the closure member is shaped so as to have a radially-inward portion that projects angularly, axially outward relative to the cup member and the peripheral edge of the closure member. As such, the refrigerant flow forces any particulate contaminants toward the peripheral edge of the shaped closure member, thereby enabling the more radially-inward apertures in the closure member to remain open.

A key aspect of this invention is the axial distribution of the nib segments on the cup member and its tubular portion. During assembly, the closure member is pressed downward into the cup member until contact is made with the desiccant within, and is thereafter secured within the cup member by the nib segments. As such, assembly of the closure member with the cup member involves a simple push-type operation, yet enables the closure member to positively confine the desiccant within the cup member's chamber, such that relative movement of the desiccant within the chamber is restricted.

According to other preferred aspects of this invention, both the tubular portion of the cup member and the exit tube of the receiver member are formed integrally with their respective members. Accordingly, joining operations are not required to secure these members within the receiver dryer assembly. One significant result is that the receiver member has a unitary construction, in which the exit tube is integrally formed with the first end of the receiver member while the second end of the receiver member is open. After the cup assembly is assembled and is inserted with the receiver member, the second end of the receiver member is spun closed in a known manner to enclose the cup assembly and achieve a final manufactured configuration for the receiver/dryer assembly.

In addition, the through-hole at the end of the tubular portion adjacent the open end of the cup member, is tapered so as to facilitate insertion of the exit tube during assembly of the receiver and cup members. Another feature of this invention is that the exit tube can be flared so as to retain the cup assembly on the exit tube. Additionally, the cup member can be provided with a sealing lip designed to seal the cup member to the exit tube and prevent improper assembly of the cup member into the tank.

With the above construction, a refrigerant fluid flows into the receiver/dryer assembly through the inlet at the first end of the receiver member, where it encounters the closure member of the cup assembly. The refrigerant fluid passes through the closure member via the apertures therein, and thereafter flows through the desiccant enclosed within the cup member's chamber and exits the second end of the cup member through the holes provided. Thereafter, the refrigerant fluid flows through the exit tube positioned along the center of the receiver/dryer assembly, and exits the receiver/dryer assembly through the outlet at the first end.

From the above, it can be seen that a significant advantage of the present invention is that the manufacturing processes used to form the receiver/dryer assembly of this invention are uncomplicated in comparison to prior art methods that entail numerous joining operations. In particular, the receiver/dryer assembly of this invention can be manufactured with a minimal number of components, so as to reduce the number of joining operations required, as well as the potential for leaks resulting from deficient joining operations.

In addition, the receiver/dryer assembly of this invention requires fewer components than that previously needed, because the components of conventional designs required to properly constrain the movement of desiccant particles have been eliminated. Instead, the receiver/dryer assembly of this invention is configured to be readily adaptable to variations in fill level of the desiccant, without requiring biasing devices or additional desiccant processing.

Accordingly, it is an object of the present invention to provide a receiver/dryer assembly for use in an automobile air conditioning system.

It is a further object of this invention that the receiver/dryer assembly be manufactured so as to require a minimal number of joining operations so as to minimize potential leakage sites.

It is still a further object of the invention that the receiver/dryer assembly include a desiccant cup assembly configured to restrain the movement of desiccant particles contained within.

It is yet another object of the invention to provide a cup assembly which prevents blowby.

It is another object of the invention that the desiccant cup assembly be readily adaptable to variations in fill level of the desiccant without requiring biasing devices or additional desiccant processing to ensure proper restraint of the desiccant particles.

It is yet another object of the invention to provide a desiccant cup assembly which will readily handle dirt in the refrigerant fluid without completely clogging.

It is yet another object of the invention that the receiver/dryer assembly include a receiver member that is capable of being manufactured to have a substantially unitary construction.

Other objects and advantages of this invention will be more apparent after a reading of the following detailed description taken in conjunction with the drawings provided.

BRIEF DESCRIPTION OF THE DRAWINGS

FIG. 1 is a longitudinal cross-sectional view of a receiver/dryer assembly in accordance with a first embodiment of this invention;

FIG. 2 is an upper end view of a desiccant cup assembly shown in FIG. 1; and

FIG. 3 is a longitudinal cross-sectional view of a desiccant cup assembly in accordance with a second embodiment of this invention.

DETAILED DESCRIPTION OF THE PREFERRED EMBODIMENT

With reference to FIG. 1, there is shown a receiver/dryer assembly 10 of a type suitable for use in an automobile air conditioning system. As is conventional, the receiver/dryer assembly 10 is adapted to be employed between a condenser and a thermal expansion valve within an air conditioning system for the purpose of removing moisture entrained in the refrigerant fluid, so as to ensure that the refrigerant fluid delivered to the expansion valve is in a liquid phase free of moisture.

As shown in FIG. 1, the receiver/dryer assembly 10 is composed of a receiver/dryer tank 12 and a desiccant cup assembly 14. In accordance with this invention, the tank 12 and cup assembly 14 are each advantageously configured so as to minimize their number of discrete components, reduce the number of joining operations necessary to form the receiver/dryer assembly 10, and facilitate assembly of the receiver/dryer assembly 10.

The tank 12 is preferably formed from an aluminum alloy which is sufficiently strong yet formable, such as wrought aluminum alloy 6061F. However, other suitable materials could also be used, including steels. The tank 12 is preferably drawn or impacted, so as to initially have an integral closed, upper end 16 and an oppositely disposed temporarily open end which remains open during assembly of the receiver/dryer assembly 10. The open end is subsequently spin-closed to form an integral lower end 18 shown in FIG. 1. As is conventional, the upper end 16 of the tank 12 includes an inlet port 20 and an outlet port 22 to the interior of the tank 12. As shown, the outlet port 22 is preferably centrally-located in the upper end 16 of the tank 12 but may be axially offset. The inlet port 20 is fluidically connected to a condenser unit (not shown) of the air conditioning system.

The refrigerant fluid, a mixture of gas and liquid, possibly containing oil for lubrication of the compressor, enters into the inlet port 20 to be processed by the receiver/dryer assembly 10. The outlet port 22 is fluidically connected to the thermal expansion valve (not shown) of the air conditioning system.

The refrigerant fluid exiting the receiver/dryer assembly 10 through the outlet port 22 comes from the lower end 18 of the tank 12 through an exit tube 24 that extends from the upper end 16 of the tank 12. The exit tube 24 is preferably integrally formed with the upper end 16 of the tank 12. This is contrary to prior art receiver/dryer designs which require a separate exit tube that must be metallurgically or mechanically joined to the receiver/dryer tank. The exit tube 24 is preferably centrally located within and along the central axis of the body of the tank 12 as shown, such that a return passage 26 formed by the exit tube 24 fluidically communicates with the outlet port 22 of the tank 12. The exit tube 24 is preferably formed during the impacting or drawing operation by which the tank 12 is formed, and during which the initially open configuration of the lower end 18 of the tank 12 is defined as described above.

With further reference to FIG. 1, the tank 12 is shown enclosing the cup assembly 14. The cup assembly 14 is preferably supported within the body of the tank 12 by the exit tube 24, with the peripheral wall of the cup assembly 14 preferably contacting the interior wall of the tank 12 to prevent blowby. As shown, the cup assembly 14 is retained on the exit tube 24 by a flared portion 28 on the exit tube 24, though more conventional retaining methods, such as the use of a palnut (not shown), could be used. The cup assembly 14 contains an appropriate amount of a suitable desiccant 30, such as a molecular sieve. In practice, the cup assembly 14 is uniformly filled with a predetermined weight of the desiccant 30. The cup assembly 14 has a cap 40 designed so as to restrain the desiccant 30, and thereby inhibit relative movement of the individual desiccant particles relative to each other caused by the refrigerant fluid entering the receiver/dryer assembly 10 and passing therethrough. The manner in which the cup assembly 14 achieves this important function will be discussed in detail below.

The cup assembly 14 is shown as being constructed of a cup 32 having an upper end 34, a closed lower end 36, and preferably an integrally-formed, centrally-located tubular portion 38. The upper end 34 is formed to be open, and then subsequently closed with the cap 40. A suitable material for the cup 32 and cap 40 is any type of plastic which is suitable for the intended application, in particular any material which is compatible with refrigerant fluid, such as polypropylene, though other suitable materials could foreseeably be used. The lower end 36 of the cup 32 preferably includes an opening 50 contiguous with a passage 52 formed by the tubular portion 38. The opening 50 and passage 52 cooperate to receive the exit tube 24 during installation of the cup assembly 14 with the tank 12, as shown in FIG. 1.

Preferably, a sealing lip 54 is formed at the opening 50 of the passage 52 and is sized to grip the exit tube 24 to resist removal of the cup assembly 14 from the exit tube 24 and form a fluid-tight seal with the exit tube 24 to prevent blowby of the refrigerant fluid. As shown in FIG. 1, the sealing lip 54 of the preferred embodiment engages a tapered region of the flared portion 28 of the exit tube 24, thereby enhancing the fluid-tight seal and keeping the cup assembly 14 in position within the receiver/dryer assembly 10.

The sealing lip 54 is designed to prevent the cup assembly 14 from being improperly inserted onto the exit tube 24.

Preferably, the passage 52 at a distal end 60 of the tubular portion 38, disposed near the upper end 34 of the cup 32, is tapered to form a chamfer 62 that facilitates insertion of the exit tube 24 during installation of the cup assembly 14 with the tank 12.

The cap 40 and the lower end 36 of the cup 32 are both formed to have a number of holes 42 and 44, respectively. The holes 42 and 44 permit the refrigerant fluid entering through the inlet port 20 of the tank 12 to flow through the cup assembly 14, where the desiccant 30 can effectively adsorb any moisture entrained within the refrigerant fluid, and thereafter enter the lower end 18 of the tank 12. The cup assembly further includes a pair of filters 46 and 48. The filter 46 is disposed adjacent the cap 40 and the filter 48 is disposed adjacent the lower end 36 of the cup assembly 14. Each of the filters 46 and 48 are preferably formed from a polyester felt material, though other materials and fabric constructions could be employed. As is conventional, the filters 46 and 48 serve to capture foreign matter entrained in the refrigerant as the refrigerant flows through the cup assembly 14. Typically, each of the filters have a defined sieve size. The sieve sizes are chosen to prevent any desiccant 30 from exiting the cup assembly 14. Preferably, the filter 46 has a larger sieve size than the filter 48 such that the filter 46 filters the larger debris from the refrigerant fluid and the filter 48 removes the smaller debris.

Also shown in FIG. 1 are a number of nib segments 56 formed at the upper end 34 of the cup 32 and the adjacent distal end 60 of the tubular portion 38. However, it is possible to limit the nibs 56 to being located only on the cup 32 or only on the tubular portion 38. The nib segments 56 are preferably formed to be axially-spaced apart from each other, as can be seen from FIG. 1, to form a number of discrete axially-distributed detents between adjacent nibs 56. FIG. 2 is a top view of the cup assembly 14, and illustrates a preferred manner in which the nib segments 56 are also circumferentially-spaced apart from each other.

A key aspect of this invention is the axial distribution of the nib segments 56 on the cup 32 and tubular portion 38, which enables an assembly operation in which the cap 40 is pressed downward into the cup 32 until contact is made with the desiccant 30. Thereafter, the cap 40 is secured within the cup 32 by the outer edge of the cap 40 being caught under the nibs 56. Preferably, the edges of the cap 40 include inner and outer peripheral lips 58 for engaging one or more of the nib segments 56 formed on the cup 32 and tubular portion 38, respectively.

The inner and outer peripheral lips 58 are designed to pliably flex over the nibs 56 as the cap 40 is inserted. As such, assembly of the cap 40 with the cup 32 involves a simple push-type operation, yet enables the cap 40 to positively confine the desiccant 30 within the cup 32, such that relative movement of the desiccant 30 is significantly restricted.

The receiver/dryer assembly 10 described above is adapted to enable a refrigerant fluid to flow into the receiver/dryer assembly 10 through the inlet port 20 at the upper end 16 of the tank 12, where it initially encounters the cap 40 of the cup assembly 14. The refrigerant passes through the cap 40 via the holes 42 formed therein, through the filter 46, through the desiccant 30 enclosed within the cup assembly 14, through the filter 48 and exits the lower end 36 of the cup 32 through the holes 44. After flowing through the cup assembly 14, the refrigerant fluid flows through the exit tube 24, through preferably the center of the receiver/dryer assembly 10, and exits the receiver/dryer assembly 10 through the outlet port 22 at the upper end 16 of the tank 12.

During a preferred manufacturing sequence of the receiver/dryer assembly 10, the tank 12 is first formed by an impact forming process in which the upper end 16, exit tube 24 and walls of the tank 12 are simultaneously formed. The cup assembly 14 is assembled separately by placing the lower filter 48 within the cup 32, usually injection molded, adjacent its lower end 36, and then filling the cup 32 with an appropriate amount of desiccant 30. Conventionally, the desiccant 30 will be dispensed into the cup 32 on the basis of a predetermined weight. Because the volume of the desiccant 30 can vary depending on particle size, the fill level of the desiccant 30 within the cup 32 is prone to deviate from a predicted level.

Next, the upper filter 46 is positioned on top of the desiccant 30, and the cap 40 is then forced into the upper end 34 of the cup 32 until resistance is met as the cap 40 and filter 46 contact the desiccant 30. Thereafter, the nib segments 56 secure the cap 40 to the cup 32 so as to complete the cup assembly 14. Notably, the nib segments 56 are axially spaced so as to enable the cap 40 to be positioned relative to the fill level of the desiccant in the cup 32 in a manner that minimizes the internal volume of the cup assembly 14 for the predetermined amount of desiccant 30 present, and thereby helps to physically restrain the desiccant 30 within the cup 32 which prevents the desiccant from abrading itself. The cup assembly 14 is then installed within the tank 12 by inserting the exit tube 24 into the chamfer 62 and through the passage 52 formed by the tubular portion 38 of the cup 32. The cup assembly 14 is slid onto the exit tube 24 as far toward the upper end 16 as possible and the flared portion 28 is then formed in the exit tube 24 to prevent the cup assembly from moving down the exit tube 24. It should be noted that it is possible to form the flared portion 28 in the exit tube 24 prior to installing the cup assembly 14. In this embodiment, the passage 52, chamfer 62 and sealing lip 54 are designed to expand past the flared portion 28. In all embodiments, the sealing lip 54 also prevents the cup assembly 14 from being installed in the wrong direction.

Finally, the lower end 18 of the tank 12 is preferably closed using a friction spin-closure technique of a type known in the art. For this purpose, the initial length of the tank 12 must be longer than the desired finished length of the receiver/dryer assembly 10, so as to allow for the formation of the closed lower end 18. The tank 12 is typically chucked on a spindle and then rotated about its longitudinal axis at a suitable speed. An appropriate tool such as a spinning wheel is operated to engage the initially open lower end 18 of the spinning tank 12 so as to displace the tank material radially inwardly to form the integral closed lower end 18 shown in FIG. 1.

In accordance with a second embodiment of this invention shown in FIG. 3, the cap 40 is formed to have a dome-shape with a radially-inward portion 40a that projects axially outward relative to the cup 32 and a radially-outward portion 40b of the cap 40. As such, the refrigerant flow forces any particulate contaminants toward the radially-outward portion 40b of the cap 40, thereby enabling the holes 42 located in the radially-inward portion 40a to remain open. Similar to the first embodiment, it is preferable to form the filter 46 immediately below the cap 40 to be adapted to remove larger particles than the filter 48 located at the lower end 36 of the cup 32. The outer peripheral lip 58 of the cap 40 can be sized to achieve a pliant interference fit with the upper end 34 of the cup 32.

From the above, it can be seen that a significant advantage of the present invention is that the manufacturing processes used to form the receiver/dryer assembly 10 of this invention are uncomplicated in comparison to prior art methods that entail numerous joining operations. In particular, the preferred receiver/dryer assembly 10 is manufactured with a minimal number of components, and eliminates conventional joining operations required to join the exit tube 24 and upper end 16 to the tank 12. As such, the tank 12 is preferably characterized by a unitary construction, in which the exit tube 24 is integrally formed with the upper end 16 of the tank 12 while the lower end 18 of the tank 12 is initially open. The cup assembly 14 can then be assembled with the tank 12, after which the lower end 18 of the tank 12 is spun closed in a known manner to enclose the cup assembly 14.

Another significant advantage of the present invention is that the receiver/dryer assembly 10 requires fewer components than that previously required, because the cup assembly 14 is configured to restrain the movement of the desiccant 30 without the use of supplemental components, such as springs. Instead, the cup assembly 14 of this invention is equipped with nib segments 56 that enable the position of the cap 40 to be readily adaptable to variations in fill level of the desiccant 30.

In addition, the chamfer 62 formed at the distal end 60 of the tubular portion 38 enhances the assembly of the cup assembly 14 with the tank 12 by facilitating the insertion of the exit tube 24 through the tubular portion 38 of the cup 32. Additionally, the sealing lip 54 around the exit tube 24 of the cup assembly 14 serves to prevent blowby. Furthermore, the exit tube 24 can be flared so as to retain the cup assembly 14 on the exit tube 24 without resorting to additional fasteners.

While the invention has been described in terms of a preferred embodiment, it is apparent that other forms could be adopted by one skilled in the art. For example, the various components of the receiver/dryer assembly 10 could be configured or altered to appear differently from that shown. Additionally, various joining techniques could be employed during the assembly of the receiver/dryer assembly 10. Accordingly, the scope of the invention is to be limited only by the following claims.

What is claimed is:

1. A refrigerant fluid dryer assembly comprising:
   a cup member having a closed end and an oppositely-disposed open end, said closed end having a central aperture and a plurality of holes formed therein;
   a centrally-located tubular portion projecting axially within said cup member from said closed end, said tubular portion having a through-hole in fluidic communication with said central aperture in said closed end of said cup member, said tubular portion forming a radially-inward boundary of an annular-shaped chamber within said cup member;
   a plurality of nib segments disposed on said cup member adjacent said open end;
   desiccant disposed within said chamber; and
   a closure member received in said open end of said cup member, said closure member having a peripheral edge engaging at least some of said plurality of nib segments so as to secure said closure member to said cup member and confine said desiccant within said chamber such that relative movement of said desiccant within said chamber is restricted, said closure member having a plurality of apertures formed therein so as to be penetrable by said refrigerant fluid.

2. The refrigerant fluid dryer assembly of claim 1 wherein said tubular portion is integrally formed with said closed end of said cup member.

3. The refrigerant fluid dryer assembly of claim 1 wherein said closed end of said cup member includes a sealing portion projecting axially outward from said closed end, said sealing portion being coaxial with said tubular portion and defining an opening in fluidic communication with said through-hole of said tubular portion.

4. The refrigerant fluid dryer assembly of claim 1 wherein said tubular portion has a distal end disposed at said open end of said cup member, said through-hole of said tubular portion being tapered at said distal end so as to define a diameter that is larger than a diameter of said through-hole.

5. The refrigerant fluid dryer assembly of claim 1 wherein said closure member has a dome-shaped portion so as to have a radially-inward portion that projects axially outward relative to said cup member and said peripheral edge of said closure member.

6. The refrigerant fluid dryer assembly of claim 1 wherein said plurality of nib segments includes axially-spaced nib segments and circumferentially-spaced nib segments formed at said open end of said cup member and on said tubular portion adjacent said open end of said cup member.

7. The refrigerant fluid dryer assembly of claim 1 further comprising a receiving member in which said cup member is enclosed, said receiving member comprising:
   a tank having a first end and an oppositely-disposed second end, said first end having first and second ports formed therein; and
   a centrally-located exit tube projecting axially within said tank from said first end of said tank, said exit tube having a passage formed therethrough in fluidic communication with said first port in said first end of said tank, said exit tube forming a radially-inward boundary of an annular-shaped receptacle within said tank, said cup member being received within said annular-shaped receptacle of said tank, said exit tube being received within said through-hole of said tubular portion of said cup member.

8. The refrigerant fluid dryer assembly of claim 7 wherein said closed end of said cup member has a sealing portion sealably engaging said exit tube of said receiving member.

9. The refrigerant fluid dryer assembly of claim 7 wherein said exit tube is integrally formed with said first end of said tank.

10. The refrigerant fluid dryer assembly of claim 7 wherein said exit tube has a distal end disposed adjacent said second end of said tank, said exit tube being flared to retain said cup member on said exit tube.

11. A refrigerant fluid dryer assembly having a cup assembly received within a receiving member:
   said receiving member comprising:
      a tank having a first end and an oppositely-disposed second end, said first end being equipped with an inlet and an outlet; and
      a centrally-located exit tube projecting axially within said tank from said first end of said tank, said exit tube having a passage formed therethrough in fluidic communication with said outlet of said tank, said exit tube forming a radially-inward boundary of an annular-shaped receptacle within said tank; and
   said cup assembly being received within said annular-shaped receptacle of said tank, said cup assembly comprising:
      a cup member having a closed end and an oppositely-disposed open end, said closed end having a central aperture and a plurality of holes formed therein;
      a centrally-located tubular portion projecting axially within said cup member from said closed end, said tubular portion having a through-hole in fluidic communication with said central aperture in said closed end of said cup member, said through-hole receiving said exit tube of said receiving member, said tubular portion forming a radially-inward boundary of an annular-shaped chamber within said cup member;

a plurality of nib segments disposed on said cup member adjacent said open end of said cup member, said plurality of nib segments including axially-spaced nib segments and circumferentially-spaced nib segments;

a first filter element located next to said closed end of said cup member and covering said plurality of holes formed therein;

desiccant disposed within said chamber and on top of said first filter element;

a second filter element located on top of said desiccant; and a closure member received in said open end of said cup member, said closure member having a peripheral edge engaging at least some of said plurality of nib segments so as to secure said closure member to said cup member and confine said desiccant within said chamber such that relative movement of said desiccant within said chamber is restricted, said closure member having a plurality of apertures formed therein so as to be penetrable by said refrigerant fluid.

12. The refrigerant fluid dryer assembly of claim 11 wherein said tubular portion is integrally formed with said closed end of said cup member.

13. The refrigerant fluid dryer assembly of claim 11 wherein said closed end of said cup member includes a sealing portion projecting axially outward and circumferentially inward from said closed end, said sealing portion being coaxial with said tubular portion and defining an opening in fluidic communication with said through-hole of said tubular portion, said sealing portion sealably engaging said exit tube of said receiving member.

14. The refrigerant fluid dryer assembly of claim 11 wherein said tubular portion has a distal end disposed at said open end of said cup member, said through-hole of said tubular portion being tapered at said distal end so as to define a diameter that is larger than a diameter of said through-hole so as to facilitate entry of said exit tube in said through-hole.

15. The refrigerant fluid dryer assembly of claim 11 wherein said closure member is dome-shaped so as to have a radially-inward portion that projects axially outward relative to said cup member and said peripheral edge of said closure member.

16. The refrigerant fluid dryer assembly of claim 11 wherein said exit tube is integrally formed with said first end of said tank.

17. The refrigerant fluid dryer assembly of claim 11 wherein said exit tube has a distal end disposed adjacent said second end of said tank, said distal end being flared so as to retain said cup assembly on said exit tube.

18. A refrigerant fluid dryer assembly having a cup assembly comprising:

a cup member having a closed end and an oppositely-disposed open end, said closed end having a central aperture and a plurality of holes formed therein;

a centrally-located tubular portion projecting axially within said cup member from said closed end, said tubular portion having a through-hole in fluidic communication with said central aperture in said closed end of said cup member, said tubular portion forming a radially-inward boundary of an annular-shaped chamber within said cup member;

a plurality of nib segments disposed on said cup member adjacent said open end of said cup member, said plurality of nib segments including axially-spaced nib segments and circumferentially-spaced nib segments;

desiccant disposed within said chamber; and a closure member received in said open end of said cup member, said closure member having a peripheral edge engaging at least some of said plurality of nib segments so as to secure said closure member to said cup member and confine said desiccant within said chamber such that relative movement of said desiccant within said chamber is restricted, said closure member being dome-shaped so as to have a radially-inward portion that projects axially outward relative to said cup member and said peripheral edge of said closure member, said closure member having a plurality of apertures formed therein so as to be penetrable by said refrigerant fluid.

19. The refrigerant fluid dryer assembly of claim 18 further comprising a receiving member in which said cup assembly is enclosed, said receiving member comprising:

a tank having a first end and an oppositely-disposed second end, said first end having first and second ports formed therein; and a centrally-located exit tube projecting axially within said tank from said first end of said tank, said exit tube having a passage formed therethrough in fluidic communication with said first port in said first end of said tank, said exit tube forming a radially-inward boundary of an annular-shaped receptacle within said tank, said cup assembly being received within said annular-shaped receptacle of said tank, said exit tube being received within said through-hole of said tubular portion of said cup assembly so as to form a fluid-tight seal therewith.

20. The refrigerant fluid dryer assembly of claim 18 further comprising a first filter element disposed within said chamber and against said closure member and a second filter element disposed within said chamber and against said closed end of said cup member, said first filter element being adapted to filter larger particles than said second filter element.

* * * * *